US011157620B2

(12) United States Patent
Fang et al.

(10) Patent No.: US 11,157,620 B2
(45) Date of Patent: Oct. 26, 2021

(54) CLASSIFICATION OF EXECUTABLE FILES USING A DIGEST OF A CALL GRAPH PATTERN

(71) Applicant: Trend Micro Incorporated, Tokyo (JP)

(72) Inventors: Chia-Ching Fang, Taipei (TW); Shih-Hao Weng, Taipei (TW)

(73) Assignee: Trend Micro Incorporated, Tokyo (JP)

(*) Notice: Subject to any disclaimer, the term of this patent is extended or adjusted under 35 U.S.C. 154(b) by 113 days.

(21) Appl. No.: 16/747,718

(22) Filed: Jan. 21, 2020

(65) Prior Publication Data

US 2021/0064747 A1  Mar. 4, 2021

Related U.S. Application Data

(60) Provisional application No. 62/892,202, filed on Aug. 27, 2019.

(51) Int. Cl.
| H04L 29/06 | (2006.01) |
| G06F 21/56 | (2013.01) |
| H04L 9/06 | (2006.01) |
| G06F 21/52 | (2013.01) |
| G06F 16/14 | (2019.01) |
| G06F 21/57 | (2013.01) |

(52) U.S. Cl.
CPC .......... *G06F 21/564* (2013.01); *G06F 16/144* (2019.01); *G06F 16/156* (2019.01); *G06F 21/52* (2013.01); *G06F 21/563* (2013.01); *G06F 21/565* (2013.01); *G06F 21/577* (2013.01); *H04L 9/0643* (2013.01)

(58) Field of Classification Search
CPC .... G06F 21/564; G06F 16/144; G06F 16/156; G06F 21/52; G06F 21/563; G06F 21/565; G06F 21/577; H04L 9/0643
See application file for complete search history.

(56) References Cited

U.S. PATENT DOCUMENTS

| 7,865,947 | B2 | 1/2011 | Fanton et al. |
| 8,321,942 | B1 * | 11/2012 | Chiueh ................. G06F 21/564 726/24 |
| 8,375,450 | B1 | 2/2013 | Oliver et al. |

(Continued)

FOREIGN PATENT DOCUMENTS

EP    1 678 635 B1    10/2013

OTHER PUBLICATIONS

Shang, Shanhu, et al. "Detecting malware variants via function-call graph similarity." 2010 5th International Conference on Malicious and Unwanted Software. IEEE, 2010. (Year: 2010).*

(Continued)

*Primary Examiner* — Shawnchoy Rahman
(74) *Attorney, Agent, or Firm* — Patrick D. Benedicto

(57) ABSTRACT

A cybersecurity server receives an executable file to be classified. A call graph of the executable file is generated. Functions of the executable file are represented as vertices in the call graph, and a vertex value is generated for each vertex. The vertex values are arranged in traversal order of the call graph to generate a call graph pattern. A digest of the call graph pattern is calculated and compared to one or more malicious digests.

20 Claims, 5 Drawing Sheets

(56) References Cited

U.S. PATENT DOCUMENTS

| | | | |
|---|---|---|---|
| 8,769,683 B1 | 7/2014 | Oliver | |
| 8,925,087 B1 | 12/2014 | Oliver et al. | |
| 9,197,665 B1 | 11/2015 | Cabot et al. | |
| 9,361,458 B1 | 6/2016 | Feng et al. | |
| 9,465,939 B2 * | 10/2016 | Alme | G06F 21/562 |
| 9,690,937 B1 | 6/2017 | Duchin et al. | |
| 9,690,938 B1 | 6/2017 | Saxe et al. | |
| 10,162,967 B1 | 12/2018 | Oliver et al. | |

OTHER PUBLICATIONS

Sirageldin, Abubakr, Baharum Baharudin, and Low Tang Jung. "Detecting malicious executable file via graph comparison using support vector machine." 2012 International Conference on Computers & Information Science (ICCIS). vol. 1. IEEE, 2012. (Year: 2012).*

Kostakis, Orestis, et al. "Improved call graph comparison using simulated annealing." Proceedings of the 2011 ACM Symposium on Applied Computing. 2011. (Year: 2011).*

Dullien, Thomas, and Rolf Rolles. "Graph-based comparison of executable objects (english version)." Sstic 5.1 (2005): 3. (Year: 2005).*

Elhadi, Ammar Ahmed E., Mohd Aizaini Maarof, and Bazara IA Barry. "Improving the detection of malware behaviour using simplified data dependent API call graph." International Journal of Security and Its Applications 7.5 (2013): 29-42. (Year: 2013).*

Call graph—Wikipedia, 4 sheets [retrieved on Nov. 12, 2019], retrieved from the internet: https://en.wikipedia.org/wiki/Call_graph.

Thunk—Wikipedia, 5 sheets [retrieved on Nov. 12, 2019], retrieved from the internet: https://en.wikipedia.org/wiki/Thunk.

Diff—Wikipedia, 10 sheets [retrieved on Nov. 12, 2019], retrieved from the internet: https://en.wikipedia.org/wiki/Diff.

Zynamics—BinDiff, 2 sheets [retrieved on Nov. 12, 2019], retrieved from the internet: https://www.zynamics.com/bindiff.html.

Google Security Blog: BinDiff now available for free, 3 sheets [retrieved on Nov. 12, 2019], retrieved from the internet https://securitygoogleblog.com/2016/03/bindiff-now-available-for-free.html.

Ssdeep—Fuzzy hashing program, 3 sheets [retrieved on Nov. 12, 2019], retrieved from the internet: https://ssdeep-project.github.io/ssdeep/index.html.

GitHub—joxeankoret/diaphora: Diaphora, the most advanced Free and Open Source program diffing tool, 5 sheets [retrieved on Nov. 12, 2019], retrieved from the internet: https://github.com/joxeankoret/diaphora.

GitHub—google/binexport: Export disassemblies into Protocol Buffers and to BinNavi databases, 9 sheets [retrieved on Nov. 12, 2019], retrieved from the internet: https://github.com/google/binexport.

IDA Pro Book, 2nd Edition | No Starch Press, 6 sheets [retrieved on Nov. 12, 2019], retrieved from the internet: https://nostarch.com/idapro2.htm.

Diaphora, a program diffing plugin for IDA Pro—Joxean Koret, 15 sheets [retrieved on Nov. 12, 2019], retrieved from the internet: https://joxeankoret.com/blog/2015/03/13/diaphora-a-program-diffing-plugin-for-ida-pro/.

Trend Micro Security Intelligence Blog—How Machine Learning echniquest Helped US find Massive Certificate Abuse by BroweFox, Jun. 11, 2018, 8 pages, available at https://blog.trendmicro.com/trendlabs-security-intelligence/how-machine-learning-techniques-helped-us-find-massive-certificate-abuse-by-browsefox/.

Wikipedia—Locality-sentive hashing, 8 pages [retrieved on May 20, 2019], retrieved from the internet: https://wikipedia.org/wiki/Locality-sensitive_hashing.

Joris Kinable, et al. "Malware Classification based on Call Graph Clustering", Aug. 27, 2010, pp. 1-12, Aalto University, Dept. of Information and Computer Science, Finland.

Swathi Pai, et al. "Clustering for malware classification", published online on Jan. 27, 2016, 13 pages, J Comput virol Hack Tech.

Peng Li, et al. "On Challenges in Evaluating Malware Clustering", 2010, 18 pages.

Kyle Soska, et al. "Automatic Application Identification from Billions of Files", Aug. 13, 2017, 10 pages.

Roberto Perdisci, et al. "VAMO: Towards a Fully Automated Malware Clustering Validity Analysis", Dec. 3-7, 2012, 10 pages.

PeHash: A Novel Approach to Fast Malware Clustering, Dec. 7, 2008, 8 pages.

Irfan Ui Haq, et al. "Malware Lineage in the Wild", Oct. 14, 2017, 15 pages.

Usha Narra "Clustering versus SVM for Malware Detection", May 2015, 71 pages, Master's Theses and Graduate Research, Dept. of Computer Science, San Jose State University, San Jose, California.

Mark Stamp "A Survey of Machine Learning Algorithms and Their Application in Information Security", Sep. 2018, 23 pages, San Jose State University, San Jose, California.

Jakub Lokoc, et al. "k-NN Classification of Malware in HTTPS Traffic Using the Metric Space Approach", Apr. 2016, 16 pages, SIRET research group, Dept. of Software Engineering, Charles University, Prague, Czech Republic.

Joy Nathalie Avelino, et al. "Ahead of the Curve: A Deeper Understanding of Network Threats Through Machine Learning", 2018, 17 pages, Trend Micro, A TrendLabs Research Paper.

Animesh Nandi, et al. "Anomaly Detection Using Program Control Flow Graph Mining from Execution Logs", Aug. 2016, 10 pages, IBM Research, IIT Kanpur.

Managed Detection and Response—Definition, 7 pages [retrieved on Jun. 14, 2019], retrieved from the internet: https://www.trendmicro.com/vinfo/us/security/definition/managed-detection-and-response.

Cluster analysis—Wikipedia, 19 pages [retrieved on Jun. 11, 2019], retrieved from the internet: https://en.wikipedia.org/wiki/Cluster_analysis.

K-nearest neighbors algorithm—Wikipedia, 10 pages [retrieved on Jun. 11, 2019], retrieved from the internet: https://en.wikipedia.org/wiki/K-nearest_neighbors_algorithm.

Autoencoder—Wikipedia, 6 pages [retrieved on Jun. 11, 2019], retrieved from the internet: https://en.wikipedia.org/wiki/Autoencoder.

DBSCAN—Wikipedia, 7 pages [retrieved on Jun. 11, 2019], retrieved from the internet: https://en.wikipedia.org/wiki/DBSCAN.

Jonathan Oliver, et al. "TLSH—A Locality Sensitive Hash", Nov. 21-22, 2013, 7 pages, The 4th Cybercrime and Trustworthy Computing Workshop, Sydney, AU.

Ban Xiaofang, et al. "Malware Variant Detection Using Similarity Search over Content Fingerprint", May 31-Jun. 2, 2014, 6 pages, IEEE The 26th Chinese Control and Decision Conference.

Computer Forensics, Malware Analysis & Digital Investigation: File Entropy explained, 4 sheetstr [retrieved on Oct. 31, 2019], retrieved from the internet: www.forensikb.com/2013/03/file-entropy-explained.html.

Using File Entropy to Identify "Ransomwared" Files—SANS Internet Storm Center, 5 sheets [retrieved on Oct. 31, 2019], retrieved from the internet: https://isc.sans.edu/forums/diary/Using+File+Entropy+to-Identify+Rasomwared +Files/21351/.

Entropy (information theory)—Wikipedia, 16 sheets [retrieved on Oct. 31, 2019], retrieved from the internet: https://en.wikipedia.org/wiki/Entropy_(information_theory).

Metada (CLI)—Wikipedia, 3 sheets [retrieved on Oct. 31, 2019], retrieved from the internet: https://en.wikipedia.org/wiki/Metadata_(CLI).

Metadata and Self-Describing Components—Microsoft Docs, Mar. 29, 2017, 7 sheets [retrieved on Oct. 31, 2019], retrieved from the internet: https://docs.microsoft.com/en-us/dotnet/standard/metadata-and-self-describing-components#metadata-and-the-pe-file-structure.

Kevin Burton "Physical Layout of a .NET Assembly", Feb. 14, 2002, 2 sheets [retrieved on Nov. 4, 2019], retrieved from the internet: www.informit.com/articles/article.aspx?p=25350&seqNum=3.

* cited by examiner

CLASSIFICATION OF EXECUTABLE FILES USING A DIGEST OF A CALL GRAPH PATTERN

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

CROSS-REFERENCE TO RELATED APPLICATION

The present application claims the benefit of U.S. Provisional Application No. 62/892,202, filed on Aug. 27, 2019, which is incorporated herein by reference in its entirety.

BACKGROUND OF THE INVENTION

1. Field of the Invention

The present invention relates generally to cybersecurity.

2. Description of the Background Art

Malware may be detected using various antivirus techniques, including by looking for malware signatures. For example, malware researchers may collect samples of malware and analyze the samples to identify patterns indicative of malware. The patterns may be deployed in an endpoint computer to scan files for malware. The patterns may also be clustered to identify malware families.

Malware may be in the form of an executable file, such as a Portable Executable (PE) file, Executable and Linkable Format (ELF) file, or Mach-O file. A digest, i.e., hash value, of a malicious executable file may be calculated using a hashing algorithm. The digest may be used as a pattern for detecting and clustering malicious executable files.

More particularly, in malware research, cyber threat hunting, and cybersecurity intelligence exchanging, digests, such as a Message Digest-5 (MD5) digest or the Secure Hash Algorithm-256 (SHA256) digest, are widely used. For example, malware researchers use digests to search for malware on the VirusTotal™ website and exchange security intelligence with Indicators of Compromise (IOS) that include digests.

However, digests have characteristics, such as one-to-one relationship between a file and its digest, that limits the ability of malware researchers to classify malware. This is because digests are not really designed for file correlation. For malware classification, other hashing algorithms, such as the ssdeep, sdhash, Trend Micro Locality Sensitive Hash (TLSH), and imphash algorithm, have been proposed to determine similarity of two executable files. The aforementioned hashing algorithms allow two executable files to be compared based on the binary content of the files.

Two executable files may also be compared using a so-called "diffing" tool. For example, the Zynamics™ BinDiff tool uses a graphical approach to identify functions that are identical and similar in two executable files. The Zynamics™ BinDiff tool, which is a plug in to the Hex-Rays™ Interactive DisAssembler (IDA), takes a higher-level view, compared to hashing algorithms, to learn the similarity or difference between two executable files. The Diaphora tool is another IDA plugin diffing tool that allows for comparison of two executable files. The IDA is described in Eagle, Chris, "The IDA Pro Book, 2nd Edition: The Unofficial Guide to the World's Most Popular Disassembler," No Starch Press, 2011.

SUMMARY

In one embodiment, a cybersecurity server receives an executable file to be classified. A call graph of the executable file is generated. Functions of the executable file are represented as vertices in the call graph, and a vertex value is generated for each vertex. The vertex values are arranged in traversal order of the call graph to generate a call graph pattern. A digest of the call graph pattern is calculated and compared to one or more malicious digests.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
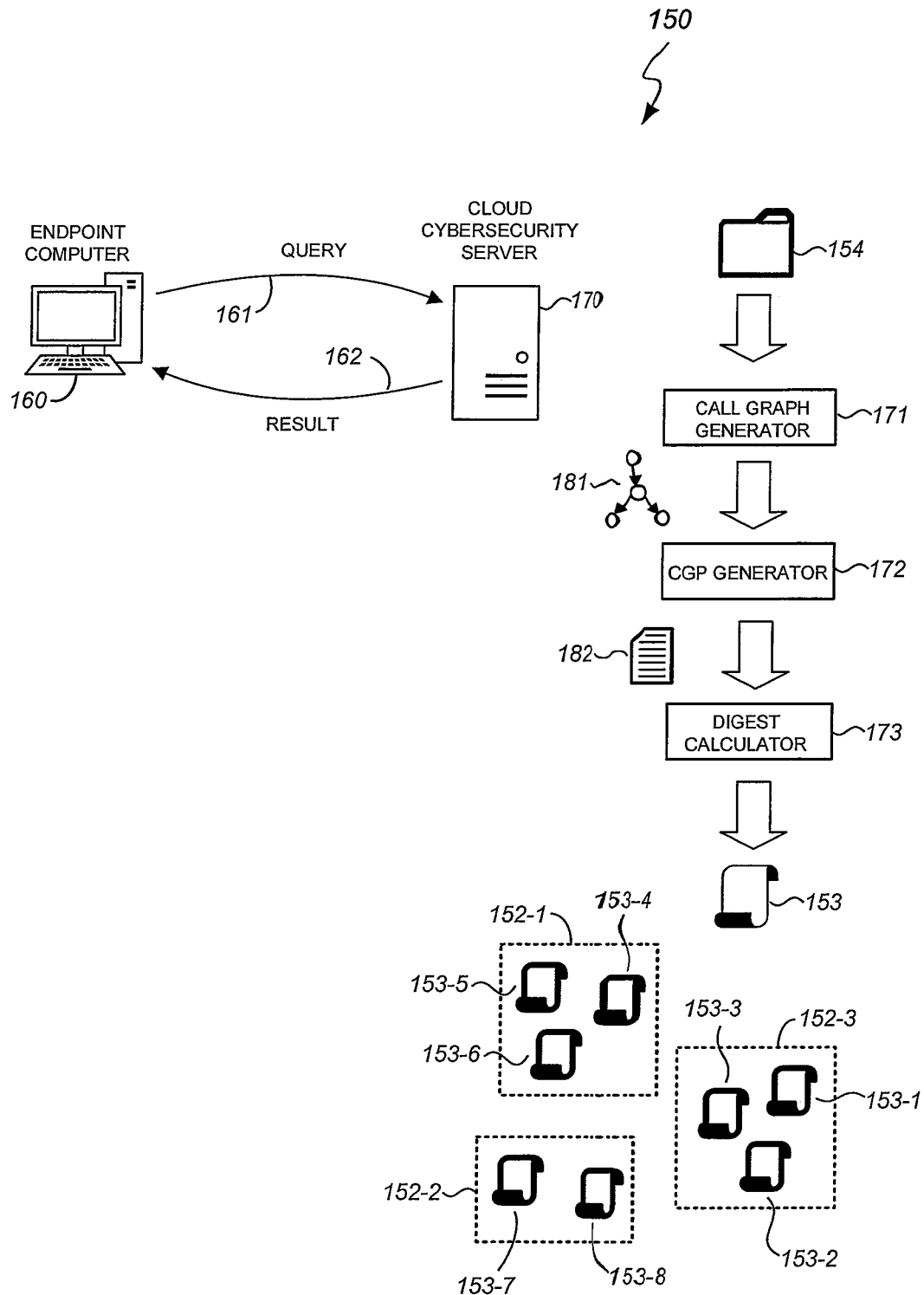
FIG. 1 shows a logical diagram of a system for classifying executable files in accordance with an embodiment of the present invention.

FIG. 1 shows a logical diagram of a system 150 for classifying executable files in accordance with an embodiment of the present invention. Classification of a target (i.e., being evaluated) executable file involves identifying one or more malicious executable files that are similar to the target executable file. Classification of a target executable file allows for determining if the target executable file belongs to a class or category of malware, such as whether the target executable file is a member of a particular malware family.

In the example of FIG. 1, the system 150 includes a cloud cybersecurity server 170. As its name indicates, the cloud cybersecurity server 170 provides an in-the-cloud service for classifying an executable file. More particularly, the cloud cybersecurity server 170 may receive a query from an endpoint computer 160 over the Internet (see arrow 161). The query may include a target executable file. The cloud cybersecurity server 170 may, in response to the query, classify the target executable file. The cloud cybersecurity server 170 may return a result of the classification over the Internet (see arrow 162), with the result indicating whether or not the target executable file is a member of a malware family.

The cloud cybersecurity server 170 may comprise hardware and software of a cloud computing infrastructure, a dedicated server, or other computing device of a cybersecurity vendor, such as Trend Micro™, Incorporated. The cloud cybersecurity server 170 is configured to generate a digest 153 of an executable file 154. The executable file 154 may be received from an in-the-cloud query as explained above, a user-submission, a third-party feed, or from other internal or external source.

In the example of FIG. 1, the cloud cybersecurity server 170 includes a call graph generator 171, a call graph pattern (CGP) generator 172, and a digest calculator 173, which are implemented as instructions that are executed by the processor of the cloud cybersecurity server 170.

The call graph generator 171 may be configured to receive the executable file 154, and to generate a call graph 181 of the executable file 154. Generally speaking, a call graph is a control flow graph that represents calling relationships between functions of an executable file. A call graph has vertices and edges between vertices, with each vertex representing a function and each edge representing a calling relationship between two functions represented by the two vertices that are connected by the edge. In the example of FIG. 1, the call graph 181 is a static call graph of the executable file 154. The call graph generator 171 may employ any suitable and generally-available call graph generation algorithm without detracting from the merits of the present invention.

The CGP generator 172 may be configured to receive the call graph 181, and to generate a call graph pattern 182 of the call graph 181. In one embodiment, the CGP generator 172 is configured to encode the functions represented by the vertices of the call graph 181 into vertex values, and to generate the call graph pattern 182 by arranging the vertex values according to a traversal order of the call graph 181. In one embodiment, a vertex value of a vertex indicates an address block of a starting address of the function represented by the vertex and a type of the function represented by the vertex.

The digest calculator 173 may be configured to receive the call graph pattern 182, and to calculate a digest 153 of the call graph pattern 182 using a hashing algorithm, such as a fuzzy hashing algorithm or a cryptographic hashing algorithm. The digest 153 is calculated from the call graph pattern 182 of the executable file 154 and is thus also referred to herein as the digest of the executable file 154.

The digest calculator 173 may employ a fuzzy hashing algorithm, such as a locality-sensitive hashing algorithm, to calculate a digest of a call graph pattern. In one embodiment, the digest calculator 173 employs the Trend Micro Locality Sensitive Hash (TLSH) algorithm to calculate the digest 153 of the call graph pattern 182. Open source program code for implementing the TLSH algorithm is available on the Internet.

Generally speaking, a locality-sensitive hashing algorithm may extract many very small features (e.g., 3 bytes) of the data being hashed and put the features into a histogram, which is encoded to generate the digest of the data. The mathematical distance between two digests may be measured to determine the similarity of the two digests, and hence the similarity of the corresponding data from which the digests were calculated. The shorter the distance, the more similar the digests. The distance may be compared to a predetermined distance threshold to detect similarity. Open source program code of the TLSH algorithm includes a distance measurement function, which may be used to determine similarity between two digests 153 that were calculated using the TLSH algorithm.

The similarity of a target digest 153 (i.e., calculated from a call graph pattern of an executable file being classified) to a malicious digest 153 (i.e., calculated from a call graph pattern of a malicious executable file) may be determined to detect whether or not the target digest 153 is also malicious. For example, the distance between the digest 153 of the executable file 154 and a digest 153-1 of a malicious executable file may be measured and compared to a predetermined distance threshold. The executable file 154 may be deemed to be malware when the distance between the digest 153 and the digest 153-1 is less than the predetermined distance threshold.

A plurality of digests 153 (i.e., 153-1, 153-2, . . . ) may also be clustered to facilitate malware classification and to identify malware families. For example, the digests 153 may be grouped into clusters 152 (i.e., 152-1, 152-2, . . . ), with each cluster 152 comprising digests 153 that are similar to one another. The digests 153 may be grouped using a suitable clustering algorithm, such as the K-nearest neighbors (KNN) clustering algorithm, Density-based spatial clustering of applications with noise (DBSCAN) clustering algorithm, ANN clustering algorithm, hierarchical clustering algorithm, etc.

A cluster 152 may have a corresponding label that indicates whether the cluster 152 is good or malicious. A cluster 152 that only has malicious digests 153 or primarily (e.g., over 90% of its members) malicious digests 153 may be labeled as malicious. Similarly, a cluster 152 that only has good digests 153 (i.e., from known good executable files) or primarily good digests 153 may be labeled as good.

A center may be determined for each cluster 152. The center of a cluster 152, which is also in the format of a digest in this example, is representative of the digests 153 of the cluster 152. The center of the cluster 152 may be described as an average, median, or some other relationship between the members of the cluster 152, depending on the clustering algorithm employed.

A target digest 153 may be compared to the centers of the clusters 152 to find a cluster 152 with members that are most similar to the target digest 153. For example, in the case where the target digest 153 is most similar to a center of a malicious cluster 152, the target digest 153 may also deemed to be malicious. The target digest 153 may be deemed to be good when the target digest 153 is most similar to a center of a good cluster 152.

As can be appreciated from the foregoing, the plurality of digests 153 may be used individually or in clusters 152. In the example of FIG. 1, the endpoint computer 160 may send an in-the-cloud query to the cloud cybersecurity server 170 to request classification of a target executable file. The endpoint computer 160 may be a user computer, a central server, or some other computer where malicious executable file detection is performed. The endpoint computer 160 may send the target executable file to the cloud cybersecurity server 170 as part of the query. The cloud cybersecurity server 170 may receive the target executable file and generate a target digest of the target executable file as explained above with reference to the digests 153. The cloud cybersecurity server 170 may compare the target digest to a malicious digest 153 or to members of a malicious cluster 152 to classify the target executable file. The target executable file may be classified as malicious when the target digest is similar to a malicious digest 153 or to one or more members of a malicious cluster 152. The target executable file may be classified as a member of a particular malware family when the target digest is similar to one or more members of a malicious cluster 152 of the malware family.

In one embodiment, the digest calculator 173 is configured to calculate the digest 153 of the call graph pattern 182 using a cryptographic hashing algorithm, such as the MD5 or SHA256 hashing algorithm. In that embodiment, a target executable file may be classified as malicious when a target digest of the target executable file matches a malicious digest 153 or one or more members of a malicious cluster 152. The target executable file may be classified as a member of a particular malware family when the target digest matches one or more members of a malicious cluster 152 of the malware family.

The degree of similarity between two digests depends on the hashing algorithm employed to calculate the digests. For example, two digests that are calculated using a cryptographic hashing algorithm may require an exact match to be similar. In contrasts, two digests that are calculated using a fuzzy hashing algorithm may require the two digests to be within a predetermined mathematical distance to be similar.

A target executable file that has been classified as a member of a malware family may be deemed to be malware. A corrective action may be performed against a target executable file that has been deemed to be malware. The corrective action may be performed by the cloud cybersecurity server 170, the endpoint computer 160, or another computer. Example corrective actions include putting the target executable file in quarantine, blocking network traffic that carries the target executable file, deleting the target executable file, and/or other actions that prevent the target executable file from being executed in a computer.

Figure 2:
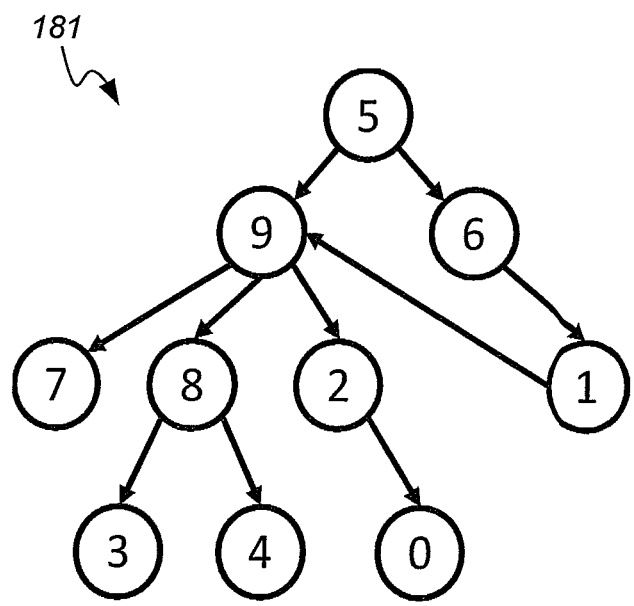
FIG. 2 shows a logical diagram of an example call graph in accordance with an embodiment of the present invention.

FIG. 2 shows a logical diagram of an example call graph 181 in accordance with an embodiment of the present invention. In the example of FIG. 2, the call graph 181 comprises a plurality of vertices (labeled as 0, 1, 2, 3, . . . ) and edges between vertices. More particularly, in the example of FIG. 2, the call graph 181 has, Vertices: {0, 1, 2, 3, 4, 5, 6, 7, 8, 9};
Root vertex: {5}; and
Edges: {1, 9} {2, 0} {5, 9} {5, 6} {6, 1} {8, 3} {8, 4} {9, 7} {9, 8} {9, 2}.

As previously noted, a vertex represents a function of an executable file. In the example of FIG. 2, the vertex 5 is a root vertex in that it does not have an ancestor. A root vertex represents a function that is not called by another function; the root vertex is typically a starting function of an executable file. A first function is an ancestor of a second function when the second function is called directly or indirectly from the first function; the second function is a descendant of the first function. In terms of the call graph 181 of FIG. 2 as an example, the vertex 5 is the ancestor of vertices 0-4 and 6-9; the vertices 0-4 and 6-9 are descendants of the vertex 5. Similarly, the vertices 7, 8, 2, 3, 4, and 0 are descendants of the vertex 9, and so on.

Figure 3:
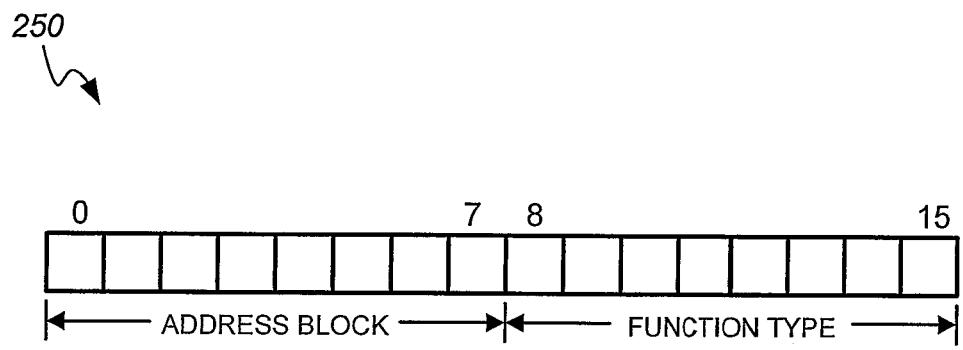
FIG. 3 shows a logical diagram of a vertex value in accordance with an embodiment of the present invention.

In one embodiment, a function represented by a vertex is encoded to generate a vertex value of the vertex. FIG. 3 shows a logical diagram of a vertex value 250 in accordance with an embodiment of the present invention. In the example of FIG. 3, the vertex value 250 is a 16-bit value, with bits 0-7 indicating an address block of the function represented by the vertex and bits 8-15 indicating a type of the function represented by the vertex. The address block may be one of a predetermined number of address blocks that indicate the starting address of the function represented by the vertex.

Figure 4:
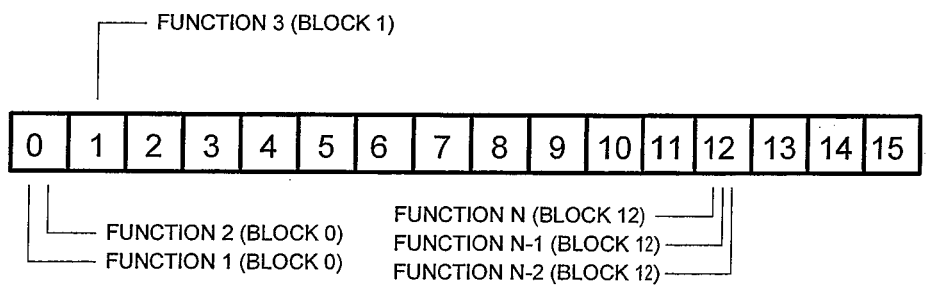
FIG. 4 shows a logical diagram of address blocks that each indicates a starting address of a function in accordance with an embodiment of the present invention.

In one embodiment, the linear address space of an executable file is divided into a predetermined number of address blocks, and the address block of a function is the address block for a range of addresses that include the starting address of the function. This is illustrated in FIG. 4, where the linear address space of the executable file is divided into 16 address blocks 0-15. In the example of FIG. 4, the starting address of a Function 1 is within a range of addresses represented by the address block 0, the starting address of a Function 2 is within a range of addresses represented by the address block 0, the starting address of a Function 3 is within a range of addresses represented by the address block 1, the starting address of a Function N is within a range of addresses represented by the address block 12, etc. As a particular example, because the starting address of the Function 3 is within the range of addresses of the address block 1, bits 0-7 of the vertex value 250 (see FIG. 3) of the vertex representing the Function 3 will reflect address block 1. Using address blocks normalizes the address information of the function.

Continuing the example of FIG. 3, the bits 8-15 of the vertex value 250 represent one of a predetermined number of function types. In one embodiment, the function type is one of the following:

Type 0 indicates a regular function that is with full disassembly and is not a library function or an imported function;

Type 1 indicates a library function that is a well-known library function;

Type 2 indicates an imported function that is from a dynamic link library;

Type 3 indicates a so-called "thunk" function that is forwarding its work via an unconditional jump; and Type 4 indicates an invalid function.

As can be appreciated, the above function types are provided for illustration purposes only. The function types may be varied to suit particular cybersecurity applications.

To generate the call graph pattern 182, the vertex value of each vertex may be arranged in accordance with a traversal order of the call graph 181. For example, assuming the call graph 181 of FIG. 2 is traversed according to the traversal order "59783420619", i.e., vertex 5 is visited, then vertex 9 is visited, then vertex 7 is visited, etc., the call graph pattern 182 of the call graph 181 of FIG. 2 may be represented as shown in FIG. 5.

Figure 5:
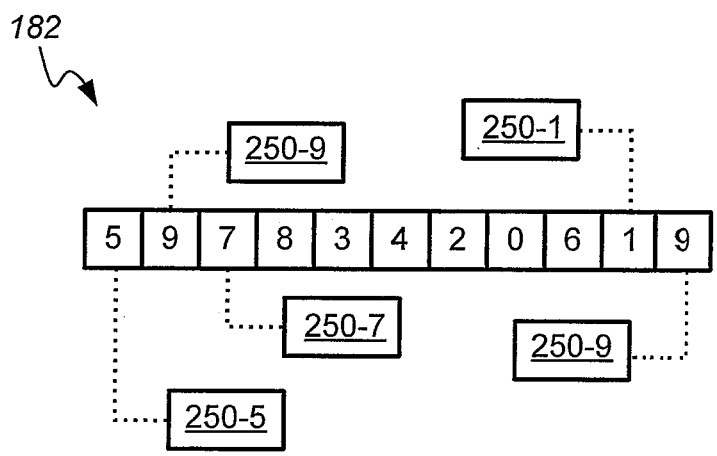
FIG. 5 shows a logical diagram of a call graph pattern in accordance with an embodiment of the present invention.

In the example of FIG. 5, box 5 represents the vertex value 250-5 of the vertex 5, box 9 represents the vertex value 250-9 of the vertex 9, box 7 represents the vertex value 250-7 of the vertex 7, etc. In the example of FIG. 5, the vertex values are concatenated in the order the corresponding vertices are visited during traversal of the call graph 181.

In one embodiment, the call graph 181 is traversed in accordance with the Depth-First Search algorithm. Other traversal algorithms may also be employed without detracting from the merits of the present invention. Table 1 below shows an example pseudocode for traversing a call graph to generate a call graph pattern in accordance with an embodiment of the present invention.

TABLE 1

Algorithm build_graph_pattern(vertex):
Input: root vertices, (each vertex has edge info that records the
    relationship to descendant)
take the vertex value into graph pattern;
if vertex is not visited then, mark the vertex as visited;
for descendant of the vertex do: recursively call
    build_graph_pattern(descendant).

Appendix A, which is at the end of the disclosure, provides an example snippet of Phyton code for generating a call graph pattern in accordance with an embodiment of the present invention. It is to be noted that, in light of the present disclosure, other suitable ways of generating a call graph pattern may also be employed.

As can be appreciated, a function has a "reuse" characteristic. That is, a function may be called multiple times during runtime of the executable file. In one embodiment, to reduce duplication and for improved efficiency, the traversal of the call graph 181 does not include all paths from a visited ancestor to descendant. The vertex value of the visited ancestor is retained in the call graph pattern to indicate the reuse relationship. As a particular example, the traversal order of the call graph 182 of FIG. 2 is "59783420619" instead of "5978342061978342". That is, the path "78342", which involves revisiting the descendants of the vertex 9, is not traversed after the second visit to the vertex 9.

Figure 6:
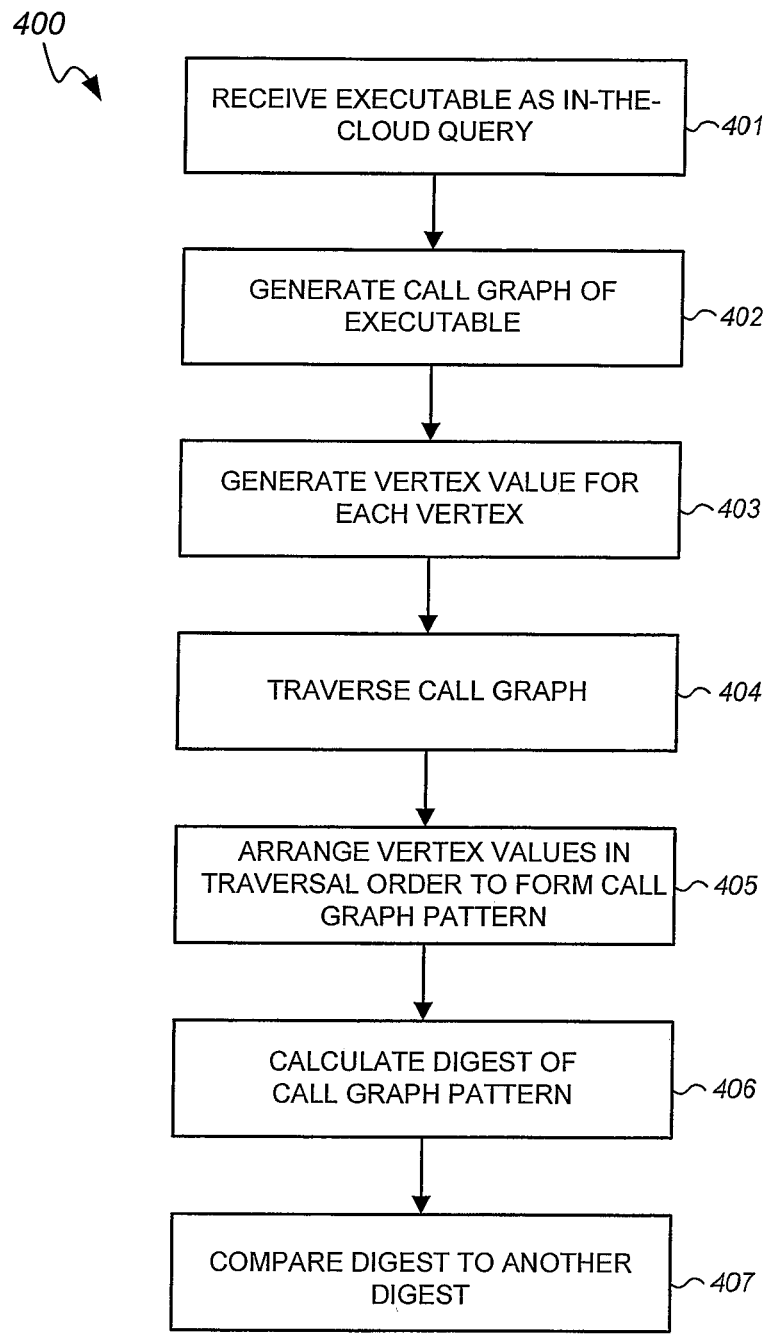
FIG. 6 shows a flow diagram of a method of classifying executable files in accordance with an embodiment of the present invention.

FIG. 6 shows a flow diagram of a method 400 of classifying executable files in accordance with an embodiment of the present invention. The method 400 may be performed by the cloud cybersecurity server 170 as programmed with the call graph generator 171, CGP generator 172, and digest calculator 173. Other components may also be employed to perform the method 400 without detracting from the merits of the present invention.

In the example of FIG. 6, an executable file is received in a cloud cybersecurity server as part of an in-the-cloud query (step 401). A call graph of the executable file is generated (step 402). In the call graph, each vertex represents a function of the executable file and each edge represents a calling relationship between two functions that are represented by two vertices that are connected by the edge. A vertex value is generated for each vertex (step 403). A vertex value of a vertex encodes a function represented by the vertex. The vertex value may indicate the address block of the starting address of the function and the type of the function. The call graph is traversed according to a predetermined traversal order (step 404). A call graph pattern is generated by arranging the vertex values in the order the corresponding vertices are visited during traversal of the call graph (step 405). The digest of the call graph pattern is calculated (step 406). The digest is classified by comparing the digest to one or more malicious digests (step 407).

Figure 7:
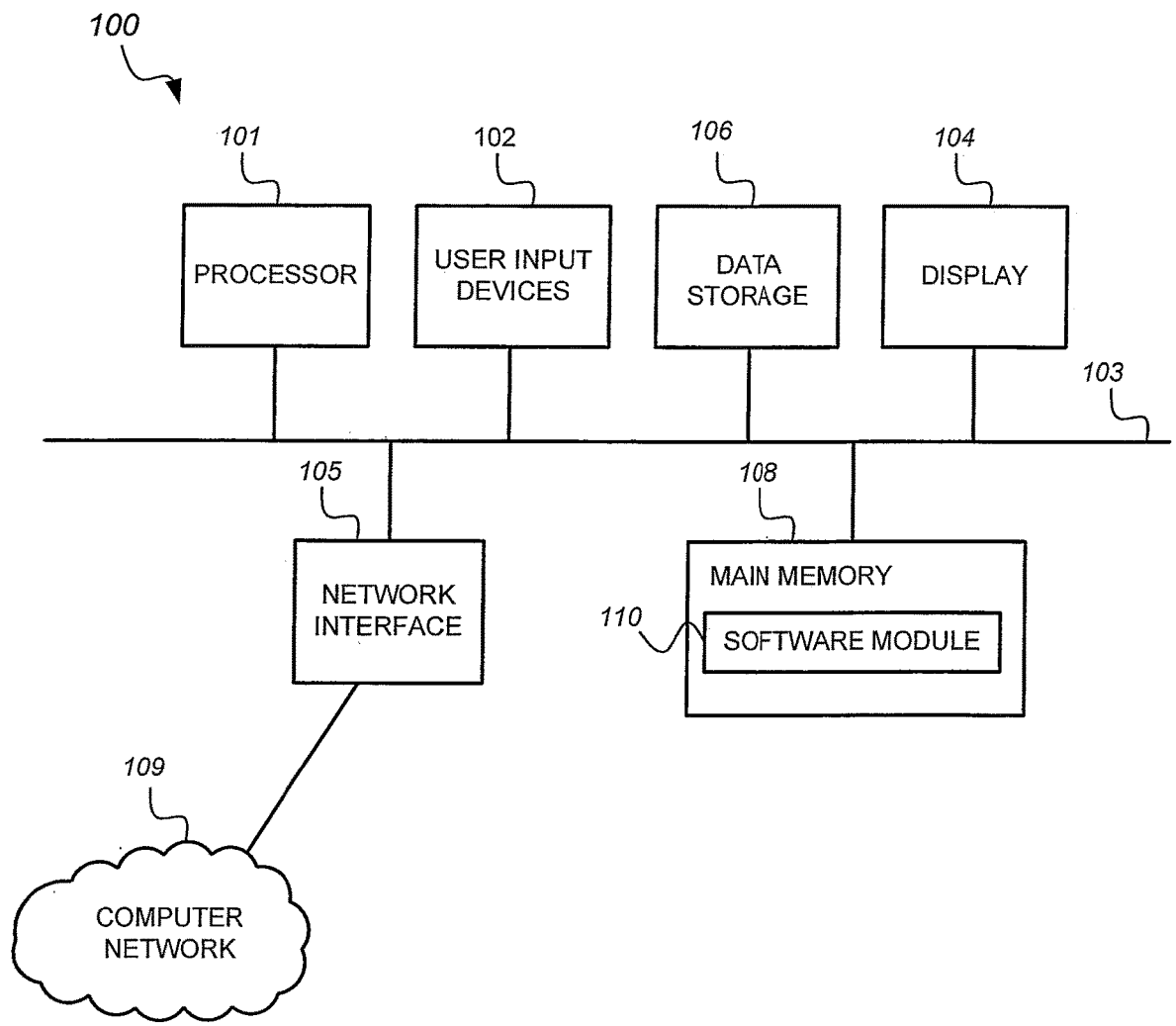
FIG. 7 shows a logical diagram of a computer system that may be employed with embodiments of the present invention.

Referring now to FIG. 7, there is shown a logical diagram of a computer system 100 that may be employed with embodiments of the present invention. The computer system 100 may be employed as a cloud cybersecurity server or other computer described herein. The computer system 100 may have fewer or more components to meet the needs of a particular cybersecurity application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display screen 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules 110, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules 110.

In one embodiment where the computer system 100 is configured as a cloud cybersecurity server, the software modules 110 comprise a call graph generator, a CGP pattern generator, and a digest calculator.

Systems and methods for classifying executable files have been disclosed. While specific embodiments of the present invention have been provided, it is to be understood that these embodiments are for illustration purposes and not limiting. Many additional embodiments will be apparent to persons of ordinary skill in the art reading this disclosure.

APPENDIX A

```
(C) 2019 Trend Micro, Incorporated.
import idc
import idautils
import idaapi
import sys
import os
import hashlib
class CallGraph:
    def __init__(self):
        self.num_func = 0
        self.graph_pattern = ''
        self.roots = [ ]
        self.vertices = { }
        self.min_ea = idaapi.cvar.inf.minEA
        self.max_ea = idaapi.cvar.inf.maxEA
        self.ea_size = self.max_ea - self.min_ea
    # Add a function as a vertex to the call graph.
    def add_vertex(self, ea, func_type):
        address_block = (ea - self.min_ea) * 16 / self.ea_size
        # Vertex Value := [Address Block] << 8 + [Function Type]
        vertex_value = chr(address_block) + chr(func_type)
        self.vertices[ea] = {'index': self.num_func, 'func_type': func_type, 'value':
```

APPENDIX A-continued

```
vertex_value, 'targets': [ ], 'is_visited': 0}
            self.num_func += 1
        # Add a function as a root vertex first, then keep the vertices that has no parents
vertices as root vertices in set_roots( ).
        def add_root(self, ea):
            self.roots.append(ea)
        # keep the vertices that has no parents vertices as root vertices.
        def set_roots(self):
            for ea in self.vertices:
                for target_ea in self.vertices[ea]['targets']:
                    if target_ea in self.roots:
                        self.roots.remove(target_ea)
        # Add the cross references that from one function to another function as edges to the
call graph.
        def connect_vertex(self, source_ea, target_ea):
            if not target_ea in self.vertices[source_ea]['targets']:
                self.vertices[source_ea]['targets'].append(target_ea)
        # Get the call graph pattern of the call graph
        def build_graph_pattern(self, vertex):
            # When arriving a vertex, keep it's value in the graph pattern first, no matter it is
visited or not.
            # This is for reused functions.
            self.graph_pattern += self.vertices[vertex]['value']
            if self.vertices[vertex]['is_visited'] == 0:
                self.vertices[vertex]['is_visited'] = 1
                for target_ea in self.vertices[vertex]['targets']:
                    self.build_graph_pattern(target_ea)
def main( ):
    imp_funcs = [ ]
    xrefs = [ ]
    cg = CallGraph( )
    file_name = idc.get_root_filename( )
    file_path = idc.GetInputFilePath( )
    # Callback of enumerating imported functions (idaapi.enum_import_names( ))
    def imp_cb(ea, name, ord):
        imp_funcs.append(ea)
        return True
    # For each function, not include imported functions, getting function properties and its
cross references.
    for fea in idautils.Functions( ):
        func_flags = idc.get_func_flags(fea)
        # NORMAL = 0
        # LIBRARY = 1
        # IMPORTED = 2
        # THUNK = 3
        if func_flags & FUNC_LIB:
            func_type = 1
        elif func_flags & FUNC_THUNK:
            func_type = 3
        else:
            func_type = 0
        # 1. Add functions which are not include imported functions as vertices to the call
graph.
        cg.add_vertex(fea, func_type)
        # 2. Treat these vertices as root vertices at the first, then keep the vertices that has
no parents vertices in set_roots( ).
        cg.add_root(fea)
        # 3. Get cross references, xref, from IDA SDK.
        items = idautils.FuncItems(fea)
        for item in items:
            for xref in idautils.XrefsFrom(item, 0):
                if xref.type != fl_F:
                    xrefs.append([fea, xref.to])
    # 4. Add imported functions as vertices to the call graph.
    num_imp_module = idaapi.get_import_module_qty( )
    for i in range(0, num_imp_module):
        idaapi.enum_import_names(i, imp_cb)
    imp_funcs.sort( )
    for imp_func_ea in imp_funcs:
        cg.add_vertex(imp_func_ea, 2)
    # 5. Add the cross references that from one function to another function as edges to
the call graph.
    for xref in xrefs:
        if xref[1] in cg.vertices:
            cg.connect_vertex(xref[0], xref[1])
    # 6. keep the vertices that has no parents vertices as root vertices.
    cg.set_roots( )
```

APPENDIX A-continued

```
# 7. Build call graph pattern
    for root in cg.roots:
        cg.build_graph_pattern(root)
if __name__ == '__main__':
    main( )
```

What is claimed is:

1. A method of classifying executable files, the method comprising:
receiving an in-the-cloud query that includes an executable file;
generating a call graph of the executable file, the call graph comprising a plurality of vertices and a plurality of edges, each of the plurality of vertices representing a function of the executable file and each edge of the plurality of edges representing a calling relationship between two vertices that are connected by the edge;
generating a vertex value of each of the plurality of vertices;
traversing the call graph;
generating a call graph pattern by arranging the vertex values of the plurality of vertices in an order the call graph is traversed;
calculating a digest of the call graph pattern; and
comparing the digest to a malicious digest.

2. The method of claim 1, wherein the vertex value of each of the plurality of vertices encodes a corresponding function.

3. The method of claim 2, wherein a type of the corresponding function is encoded in the vertex value.

4. The method of claim 2, wherein an address block that includes a starting address of the corresponding function is encoded in the vertex value.

5. The method of claim 1, further comprising:
detecting that the digest is similar to the malicious digest; and
in response to the digest being detected to be similar to the malicious digest, deeming the executable file to be malicious.

6. The method of claim 5, further comprising:
in response to the query, sending a result indicating that the executable file is malicious.

7. The method of claim 1, wherein the malicious digest is a member of a cluster of malicious digests and the digest is detected to be similar to the malicious digest.

8. The method of claim 7, further comprising:
detecting that the executable file is a member of a malware family that includes malicious executable files whose digests are members of the cluster of malicious digests.

9. The method of claim 1, wherein the digest of the call graph pattern is calculated using a fuzzy hashing algorithm.

10. The method of claim 1, wherein the digest of the call graph pattern is calculated using a cryptographic hashing algorithm.

11. A system comprising:
a cybersecurity server comprising at least one processor and memory, the memory storing instructions that when executed by the at least one processor cause the cybersecurity server to:
receive an executable file;
generate a call graph of the executable file, the call graph comprising a plurality of vertices and a plurality of edges that each connects two vertices of the plurality of vertices, each of the plurality of vertices representing a function of the executable file and each of the plurality of edges representing a calling relationship between two functions of the executable file;
generate a plurality of vertex values, each vertex value of plurality of vertex values corresponding to a vertex of the plurality of vertex;
traverse the call graph;
generate a call graph pattern by arranging the plurality of vertex values in an order each of the plurality of vertices is visited during traversal of the call graph;
calculate a digest of the call graph pattern; and
compare the digest to a malicious digest.

12. The system of claim 11, further comprising:
an endpoint computer that sent the executable file to the cybersecurity server over the Internet.

13. The system of claim 11, wherein the instructions stored in the memory when executed by the at least one processor cause the cybersecurity server to calculate the digest using a fuzzy hashing algorithm.

14. The system of claim 11, wherein the instructions stored in the memory when executed by the at least one processor cause the cybersecurity server to calculate the digest using a cryptographic hashing algorithm.

15. The system of claim 11, wherein each vertex value of the plurality of vertex values encodes a corresponding function.

16. The system of claim 15, wherein each vertex value of the plurality of vertex values indicates an address block that includes a starting address of the corresponding function.

17. The system of claim 15, wherein each vertex value of the plurality of vertex values indicates a type of the corresponding function.

18. A method of classifying an executable file, the method comprising:
generating a call graph of an executable file, the call graph comprising a plurality of vertices and a plurality of edges that each connects two vertices of the plurality of vertices, each of the plurality of vertices representing a function of the executable file and each of the plurality of edges representing a calling relationship between two functions of the executable file;
encoding functions represented by the plurality of vertices into a plurality of vertex values;
generating a call graph pattern by arranging the plurality of vertex values according to a traversal order of the call graph;
calculating a digest of the call graph pattern; and
comparing the digest to a malicious digest.

19. The method of claim 18, wherein the digest is calculated using a fuzzy hashing algorithm.

20. The method of claim 18, wherein the digest is calculated using a cryptographic hashing algorithm.

* * * * *